(12) United States Patent  
Wang et al.

(10) Patent No.: US 12,088,463 B1
(45) Date of Patent: Sep. 10, 2024

(54) AUTOMATED CONFIGURATION OF SOFTWARE APPLICATIONS

(71) Applicant: Wells Fargo Bank, N.A., San Francisco, CA (US)

(72) Inventors: Tao Wang, Davis, CA (US); William Brian Bonner, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/160,555

(22) Filed: Jan. 27, 2023

(51) Int. Cl.
*H04L 41/0816* (2022.01)
*H04L 41/0806* (2022.01)

(52) U.S. Cl.
CPC ...... *H04L 41/0816* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 10,911,470 B2 | 2/2021 | Muddu et al. | |
| 11,150,971 B1 | 10/2021 | Srinivasan et al. | |
| 11,263,172 B1 | 3/2022 | Chang et al. | |
| 2015/0058355 A1* | 2/2015 | Naqvi | G06F 16/951 707/746 |
| 2016/0073351 A1* | 3/2016 | Cardozo | H04W 52/0258 455/574 |
| 2019/0028537 A1 | 1/2019 | Krishna Singuru | |
| 2020/0265303 A1 | 8/2020 | Osogami | |
| 2021/0051060 A1* | 2/2021 | Parvataneni | H04L 41/5041 |
| 2021/0273949 A1 | 9/2021 | Howlett et al. | |
| 2022/0043731 A1 | 2/2022 | Larson et al. | |
| 2022/0138151 A1 | 5/2022 | Yelheri et al. | |
| 2022/0138871 A1 | 5/2022 | Tiwari et al. | |
| 2022/0198265 A1 | 6/2022 | Cintas et al. | |
| 2022/0255787 A1 | 8/2022 | Lombardi et al. | |

FOREIGN PATENT DOCUMENTS

| WO | WO-2014160296 A1 | 10/2014 |
| WO | WO-2016153790 A1 | 9/2016 |
| WO | WO-2019023004 A1 | 1/2019 |

* cited by examiner

*Primary Examiner* — Scott B Christensen
(74) *Attorney, Agent, or Firm* — SCHWEGMAN LUNDBERG & WOESSNER, P.A.

(57) ABSTRACT

Systems and methods may generally be used to configure applications, specifically cloud-based applications or software as a service (SaaS) applications. An example method may include receiving data indicating a performance condition of the network environment. The example method may include classifying the performance condition into one of at least two categories, where the two categories include a normal category indicating a normal condition of the network environment and at least one non-normal category indicating at least one non-normal condition of the network environment. The example method can further include setting configuration parameters corresponding to a selected one of the at least two categories, responsive to detecting at least one performance condition corresponding to the selected category. The application can subsequently be operated in the network based on the configuration parameters.

20 Claims, 5 Drawing Sheets

AUTOMATED CONFIGURATION OF SOFTWARE APPLICATIONS

BACKGROUND

Software applications in use today may be delivered over the Internet, with software providers managing application performance, security, and other aspects remotely from user devices. Users expect these software applications to be easy to use without delays or system downtime, and providers attempt to provide this experience by configuring the software applications take into consideration a variety of conditions. Because these conditions can vary with time and in different usage scenarios, it can be difficult and time consuming to configure applications to provide a good user experience.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and techniques described herein may be used to configure software applications, in particular software applications that are hosted in the cloud such as software as a service (SaaS) products. The SaaS model allows users to connect to applications over the Internet. The underlying infrastructure, software, data, etc. for the applications can be located in the service provider's data center, and the service provider may manage security, service agreements, and other aspects of the product. Software users and groups of users may have different needs or level of use. Accordingly, some level of configuration is desired.

Technological problems arise in configuring SaaS products. Some level of configuration can be handled by the users themselves, for example by manipulating existing settings and preferences on the user device. Other configuration can be done by the provider to improve efficiency or other application aspects for all users of the application. However, it can be difficult to find a configuration that is optimal for users over a long time frame, especially when the time frame can include different cycles or seasonality issues that create variations in application usage. Software products may also be used in a large number of different scenarios, including both normal use cases and non-normal scenarios. Non-normal scenarios can include emergencies or can occur after certain user actions that cause an undesirable effect on the system. Providing different configuration settings for each use case and for each software product can lead to generation of an unwieldy number of configurations.

These and other concerns are addressed using systems and techniques of various embodiments that generate configuration parameters, and groups of parameters, based on the types of use cases (e.g., use case "buckets") rather than customizing configurations for each and every individual use case and for each and every application. In some examples, a model, such as a machine learning (ML) or deep learning model may be used proactively to predict time frames (e.g., during the year, season, week, or other unit of time) in which the application/s may be subject to high volumes of user interaction. Other ML or deep learning models can be trained in a reactive fashion to have a set of rules that can bring the software application/s into a certain state to counter abnormal or adverse events, such as power outages or data outages. In at least these embodiments, a set of rules can be developed to react to particular events or, in a predictive sense, to provide rules for handling imminent events.

Figure 1:
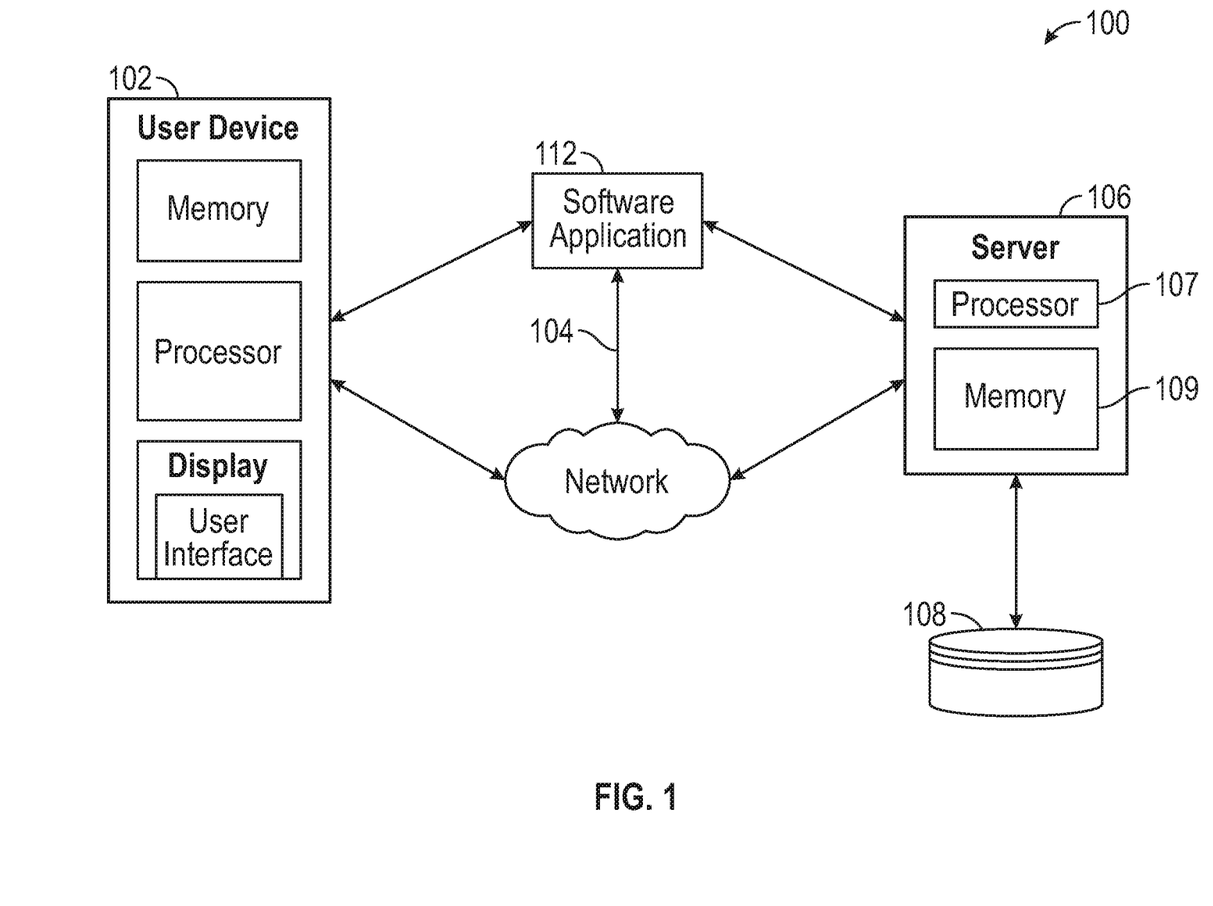
FIG. 1 illustrates a system for configuring software applications in accordance with some embodiments.

FIG. 1 illustrates a system 100 for configuring software applications in accordance with some embodiments. The system 100 includes a server 106, which may be used to provide configuration parameters for the software application 112. The server 106 may include a processor 107 and memory 109 and may be in communication with or include a database 108. The server 106 may communicate, for example, via a network 104 (e.g., the Internet), with one or more of user device/s 102 and software application/s 112. The software application/s 112 can include cloud-based applications such as SaaS products. While one software application 112 is shown, the system 100 can include multiple software applications of similar or different types. The software application/s 112 may communicate with the user device/s 102 via the network 104. The user device/s 102 may include memory, a processor, and a display for presenting information on a user interface. However, user device 102 does not need to include a display. Rather, the user device 102 can include Internet of Things (IoT) devices, edge computing devices, etc.

The server 106 may be operated by a SaaS product provider or vendor. The server 106 can include a processor 107 configured to receiving data indicating a performance condition of the network environment or the application/s 112 or the user device/s 102. The processor 107 can use that data or other data stored in the memory to configure the application/s 112. More detail regarding the data flow and processing are provided with reference to FIG. 2.

Figure 2:
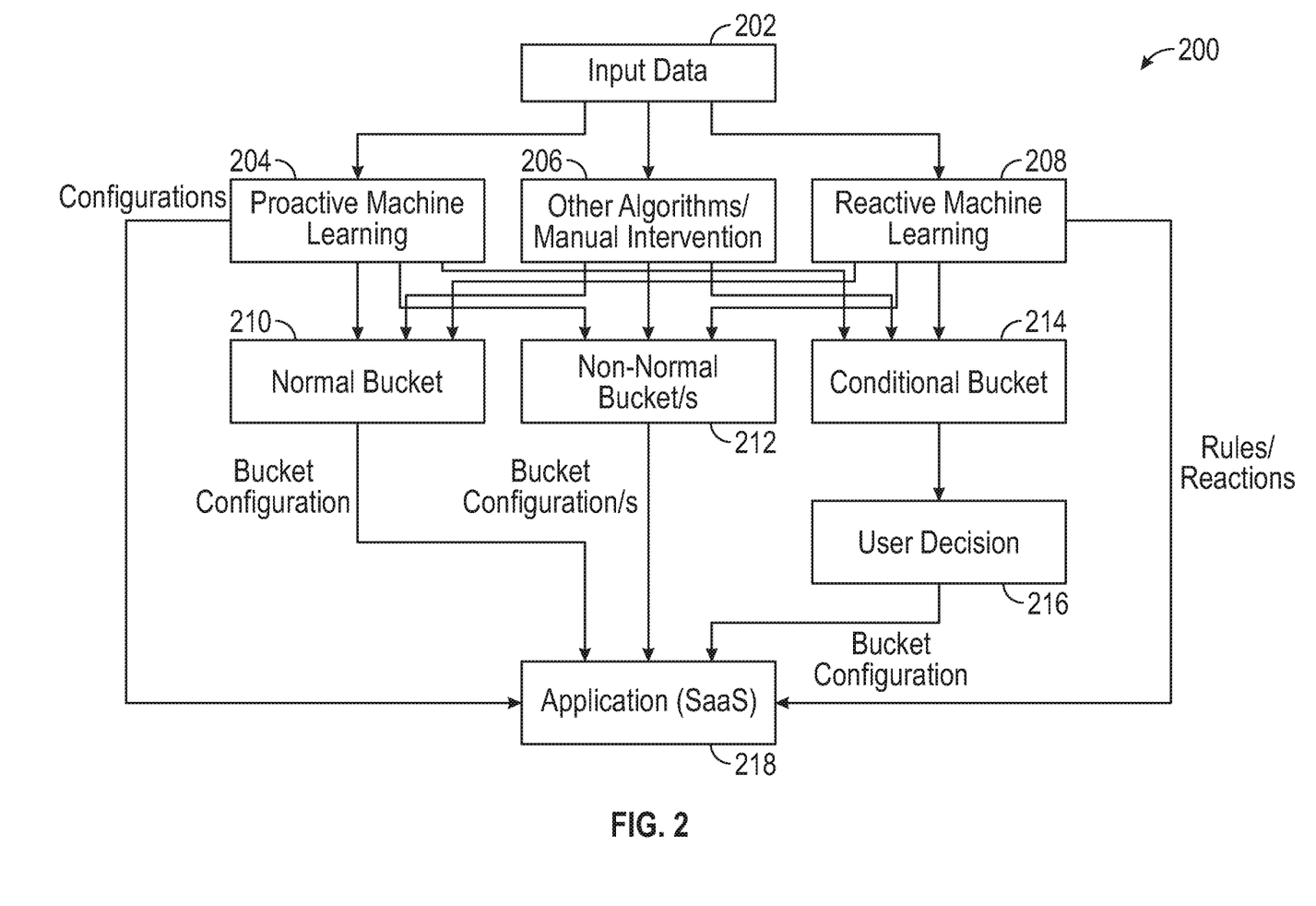
FIG. 2 illustrates a high-level overview of information flow in accordance with some embodiments.

FIG. 2 illustrates a high-level overview 200 of information flow in accordance with some embodiments. The processor 107 (FIG. 1) can receive various types of input data 202 to be used for later classification and configuration as described later herein. Input data 202 can include telemetry data regarding application usage and metrics, performance data, error data, etc. The input data 202 can include user behavior data (e.g., user clicks), user identification data, device identification data, operational data, etc. Operational data can be used to detect frequently-used features. Operational data can help reveal the tasks performed or the challenges experienced by users of the software. Therefore, operational data can provide insights into how software should perform to enhance user experience. Aggregating operational data can provide a way of categorizing users, in addition to data (e.g., putting users in different "buckets"

such that upon detection of those users, different configuration settings can be generated. As mentioned above, users and user devices can include mobile computing devices, personal computers, IoT devices, sensors, etc.

The processor 107 can classify the performance condition into one of at least two categories, or "buckets." These categories can include a "normal" bucket 210, indicating a normal condition of the network environment, application/s 112, or user device/s 102. Normal conditions can include, for example, conditions in which errors are not present, there is not excessive load, and users are not providing unexpected inputs or interactions. The buckets or categories can further include at least one non-normal category or bucket 212, indicating at least one non-normal condition of the network environment such as error conditions, unexpected user inputs or interactions, high load conditions, etc. Unexpected user conditions can include error conditions of IoT devices or sensors, or indications that human users are having problems using the application (wherein the indications can be provided manually or sensed by computing devices or the processor 107). The buckets can include a conditional bucket 214, and the processor 107 can request user input at block 216 to move performance conditions within the conditional bucket (or category) 214 into one of the normal bucket 210 or non-normal bucket/s 212.

Classification can be performed using various algorithms or machine learning models, or classification can be provided manually. For example, input data can be provided for classification and/or learning to a proactive machine learning model 204 and/or a reactive machine learning model 208, which are described in more detail with respect to FIG. 4. Additionally or alternatively, input data 202 can be provided to other algorithms or for manual intervention at block 206. For example, a user may be asked to categorize input data 202 manually into a normal bucket 210 or non-normal bucket/s 212. All of proactive machine learning model 204, block 206 and reactive machine learning model 208 can be used to perform classification. For example, a weighting algorithm can be used to weight different classifications provided by each of the proactive machine learning model 204, reactive machine learning model 208 or other algorithms/manual intervention 206. For example, more weight may be given to user intervention as an override feature. Weights may be used to measure performance or for training of the proactive machine learning model 204 and the reactive machine learning model 208. The weighting process of different machine learning models (e.g., proactive machine learning model 204 and/or a reactive machine learning model 208), deep learning models or other model-based processes, over time, can mature and a decision table-like structure can be developed. For example, given a condition A, a machine learning algorithm B can have an accuracy of 70% and a deep learning algorithm C can perform and have a 93% accuracy in predicting. In this example, the deep learning algorithm C can be given more weight when condition A is encountered. As an additional example, given condition D, if user intervention E always outperforms (or mostly outperforms) the machine learning and deep learning models, then when condition D occurs, all decisions should be presented to the user for manual classification.

Figure 3:
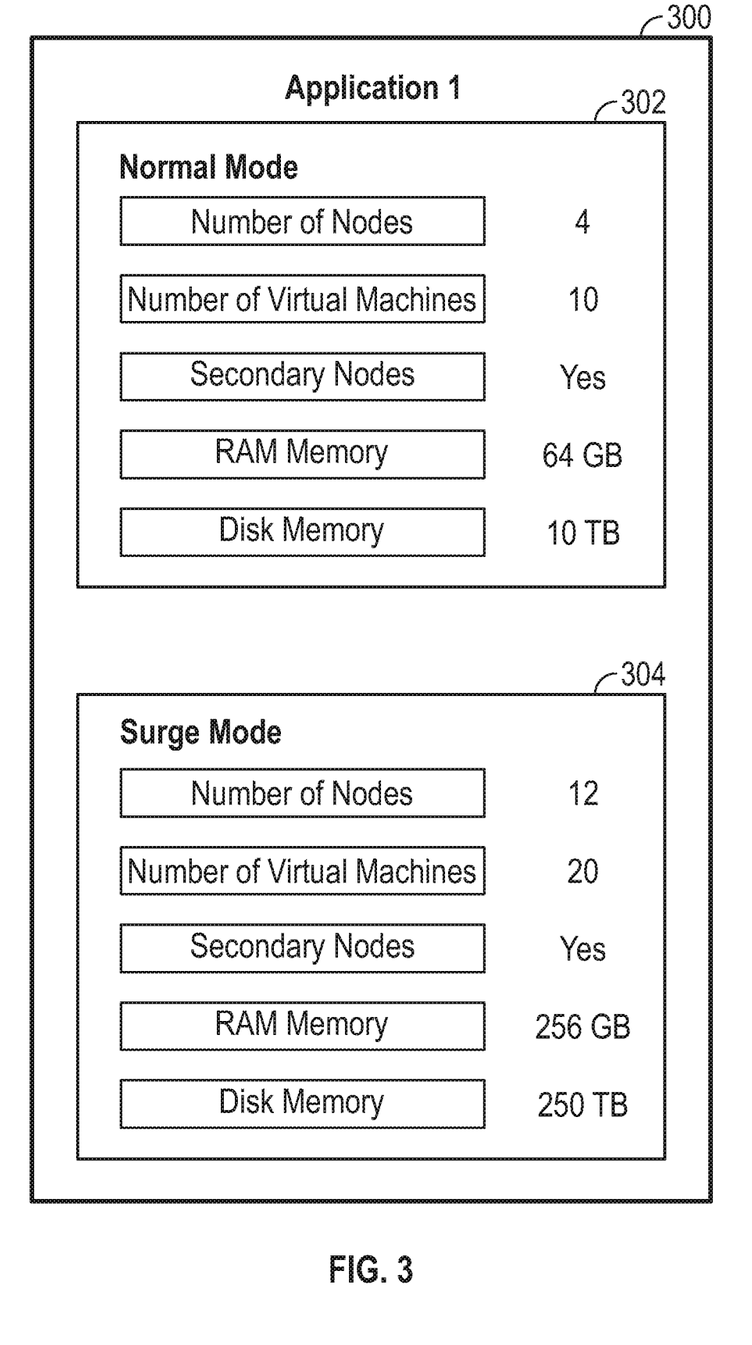
FIG. 3 illustrates configuration settings for an application in accordance with various embodiments.

The processor 107 can set configuration parameters for the application 218 (or for a group of similar applications or different applications not shown in FIG. 2). The configuration parameters can be set per category, or bucket (e.g., normal bucket 210, non-normal bucket/s 212) such that a standardized set of configuration parameters can be provided per bucket. This removes the need to provide configurations individually for each use case. Example configurations are shown in FIG. 3. Configuration parameters can include parameters such as resource assignments on a server 106.

FIG. 3 illustrates configuration settings for an application in accordance with various embodiments. An example application 300 can have a normal mode configuration 302 and a surge mode configuration 304. In the example described in FIG. 3, the application may include a mobile banking application. However, the application 300 can include any SaaS product or cloud-hosted application provided to multiple users. Also as mentioned earlier herein, the configuration settings can be applied to similar applications, such as mobile investment applications or other mobile or customer service-based applications. This removes the need to provide configurations individually for similar application.

As seen in FIG. 3, some example configuration settings can include number of nodes deployed on the cloud; number of regions that the nodes are deployed to; number of virtual machines; whether each node has a secondary backup node and, if so, the number of secondary backup nodes; RAM memory provided for each virtual machine, number of disk of storage, etc. While particular settings are described, configurations can include additional settings, fewer settings, etc. In normal mode configuration 302, for example, four nodes on cloud can be deployed to four regions of the United States (or other country, continent, sub-region or super region); each node can contain ten virtual machines and each node can have a secondary node as backup; each virtual machine that is running the application can have 64 GB RAM memory and 10 TB SSD disk as storage. In the example shown, providers may expect to process a number (e.g., 500,000) simultaneous online users per node. In a surge mode (in contrast to normal mode), algorithms described later herein can predict a surge of online users. Settings can be switched to twelve nodes across 4 regions of United States (or other country, continent, sub-region or super region); each node can contain 20 virtual machines; each node can have a secondary node for backup and load balancing if necessary; each virtual machine can be switched to have 256 GB RAM memory, 250 TB high speed SSD disk as storage. In the example providers can expect to handle a larger number (e.g., 1.5 million) simultaneous online users per node. It will be appreciated that these are merely sample values for each of a normal mode and surge mode, and other values and other parameters can be included. Furthermore, other modes (e.g., categories or buckets) can include other values for configuration settings.

Subsequent to setting configuration parameters based on bucket or category, the processor 107 can operate the application/s 112 in the network environment using the configuration parameters. The configuration settings can subsequently be switched to other settings or groups of settings. For example, if a surge of service requests is observed (e.g., detected based upon number of users or user growth becoming larger than threshold), then a normal mode application/s 112 can be switched to surge mode. Conversely, if growth in users is negative (e.g., number of users is decreasing), the application/s 112 can be switched from a surge mode to, e.g., a normal mode. In other examples, if a predicted time of surge is nearing, or a predicted time of a decrease in usage is nearing, the application/s 112 mode can be switched. This can occur subsequent to holidays when the processor 107 predicts reduced need, or conversely if holidays are approaching. Other predictions can include predicted peak vacation travel, predicted paydays, end-of-month, etc. Predictions can be made using machine learning as described below. Modes can also be switched manually by an administrator for any reason such as predicted upcoming events regionally or otherwise.

Referring again to FIG. 1, the database 108 or the server 106 may store a model (e.g., a machine learning trained model) or more than one model (e.g., proactive and reactive models described later herein with respect to FIG. 4), past actions (e.g., of a user of the user device/s 102 or of the application/s 112) or the like. The server 106 may retrieve the model/s, one or more past actions, from the database 108 for example to present information to an administrator or to prompt for manual entries regarding configuration settings.

Figure 4:
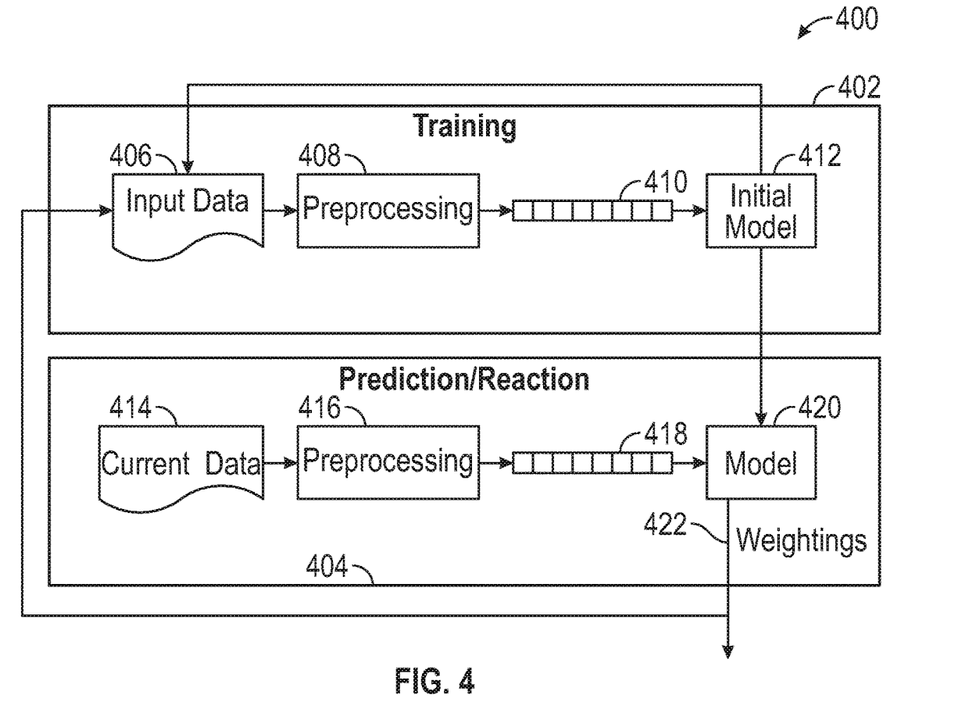
FIG. 4 illustrates machine learning engine for training and execution in accordance with some embodiments.

FIG. 4 illustrates machine learning engine 400 for training and execution related to configuring software applications in accordance with some embodiments. The machine learning engine 400 may be deployed to execute at provider server 106, for example by the processor 107 (FIG. 1). A system may calculate one or more weightings for criteria based upon one or more machine learning algorithms. In some examples, more than one model may be generated or used. For example, a proactive model can predict when during the year (or other time interval) there may be a volume increase for user interactions of a particular module, service, application, etc. A second model can include a reactive model which, subsequent to or in response to an occurrence (such as emergency power outage, data outage, sabotage activity, unexpected user interaction, etc.) cam generate rules to handle or counteract such occurrence. Reactive models can also be used in a predictive sense to generate rules based on imminent events even if those events were not predictable.

Machine learning engine 400 uses a training engine 402 and a prediction engine 404. Training engine 402 uses input data 406, for example after undergoing preprocessing component 408, to determine one or more features 410. The one or more features 410 may be used to generate an initial model 412, which may be updated iteratively or with future labeled or unlabeled data (e.g., during reinforcement learning).

The input data 406 may include an attribute, such as any of the input data 202 described above with reference to FIG. 2. In the prediction/reaction engine 404, current data 414 may be input to preprocessing component 416. In some examples, preprocessing component 416 and preprocessing component 408 are the same. The prediction/reaction engine 404 produces feature vector 418 from the preprocessed current data, which is input into the model 420 to generate one or more criteria weightings 422. The criteria weightings 422 may be used to output a prediction, as discussed further below.

The training engine 402 may operate in an offline manner to train the model 420 (e.g., on a server). The prediction/reaction engine 404 may be designed to operate in an online manner (e.g., in real-time, by SaaS provider devices, etc.). In some examples, the model 420 may be periodically updated via additional training (e.g., via updated input data 406 or based on labeled or unlabeled data output in the weightings 422) or based on identified future data, such as by using reinforcement learning to personalize a general model (e.g., the initial model 412) to a particular user. In some examples, the training engine 402 may use a trend analysis over time, for example with a user selected or a model identified range. The trend analysis may indicate whether a degree to which the SaaS application is overloaded or otherwise is out of trend using a time series of data. Examples of positive or good outcomes may include any that do not result in bad outcomes (e.g., systems remain operable with adequate user satisfaction with respect to service level agreements, etc.), or one where an objective measurement is obtainable, such as a predicted number of users being adequately served without user complaint or detected application errors or failures, etc. In some examples, a user may provide positive or negative feedback on application speed or responsiveness for use in labeling.

The initial model 412 may be updated using further input data 406 until a satisfactory model 420 is generated. The model 420 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 402 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 402. In an example embodiment, a regression model is used and the model 420 is a vector of coefficients corresponding to a learned importance for each of the features in the vector of features 410, 418. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained, the model 420 may output suggested configuration settings or rules for the SaaS application/s 218 as described herein. In other examples, the model 420 may classify input data 202 into buckets and operations can be monitored over time for additional model 420 training.

Figure 5:
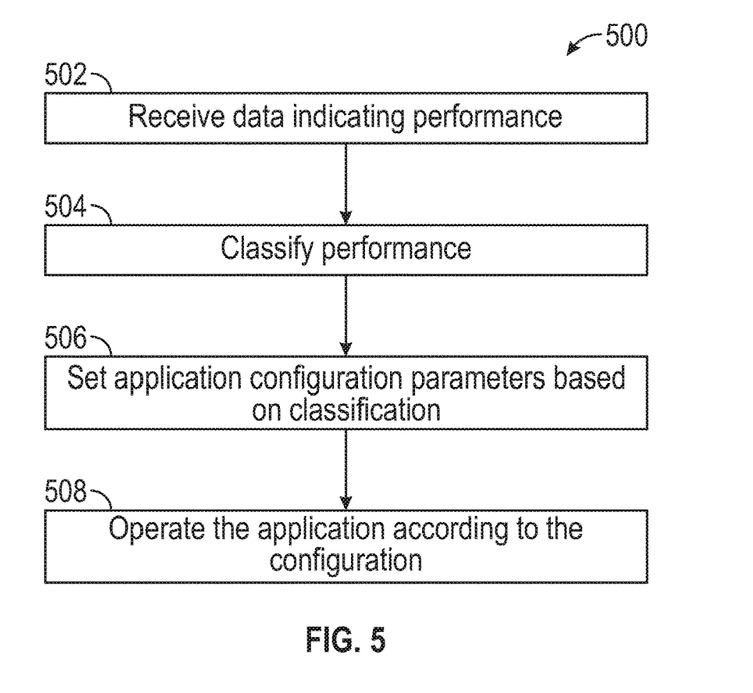
FIG. 5 illustrates a flowchart showing a technique for preventing financial abuse of a vulnerable user in accordance with some embodiments.

FIG. 5 illustrates a flowchart showing a method 500 for configuring software applications in accordance with some embodiments. In an example, operations of the method 500 may be performed by processing circuitry, for example processor 107 (FIG. 1). The method 500 may be performed by processing circuitry of a device (or one or more hardware or software components thereof), such as those illustrated and described with reference to FIG. 6.

The method 500 includes an operation 502 to receive data indicating a performance condition of the network environment or the application.

The method 500 includes an operation 504 to classify the performance condition into one of at least two categories (e.g., "buckets" as described earlier herein). The categories can include a normal category indicating a normal condition and at least one non-normal category indicating at least one non-normal condition. Categories or buckets can also include a conditional category. In operation 504, user input can be requested to move performance conditions within the conditional category into one of the normal category or the at least one non-normal category.

The method 500 includes an operation 506 to set configuration parameters for the application. The configuration parameters can correspond to a selected one of the at least two categories. The operation 506 can be performed responsive to detecting at least one performance condition classified into the selected one of the at least two categories. In some examples, the operations 504 and 506 can include forecasting an application pattern for the application and learning a relationship between calendar dates and the application pattern. Learning the relationship can include detecting a peak traffic level. The learning can be performed as described above with respect to FIG. 4. Subsequent application patterns can be predicted based on this relationship, and the processor 107 can provide configuration parameters to the application based on the predictions. In addition, performance conditions can be categorized based on the learning.

The method 500 can include acquiring network traffic transaction data (or other telemetry data, user data, etc.) from the network environment and predicting traffic loads based on the network transaction data. Forecasting the application pattern can include user interactions with the application. For example, clicks and other user interactions can be tracked, and if unexpected clicks or user interactions change the operation of the application in an unexpected manner, the application can be configured using a non-normal configuration setting for subsequent operations. In some examples, the processor 107 can forecast results of non-normal performance conditions within the network environment and learn rules for reacting to non-normal performance conditions. The rules can be provided for subsequent application configuration for subsequent occurrences of these non-normal performance conditions. For example, if a power outage occurs, rules can be generated for operating the application during power outages, and then configuration settings can be generated using those rules for subsequent power outages.

The method 500 includes an operation 508 to operate the application in the network environment using the configuration parameters. Configuration settings can be shared across other SaaS applications, such as similar SaaS applications or applications having similar types of users. By implementing methods according to method 500, SaaS providers and administrators can configure applications more easily, because separate configuration settings are not needed for each and every possible use case for each and every application provided. Software configuration can be simplified, and time spent in system administration can be reduced.

Figure 6:
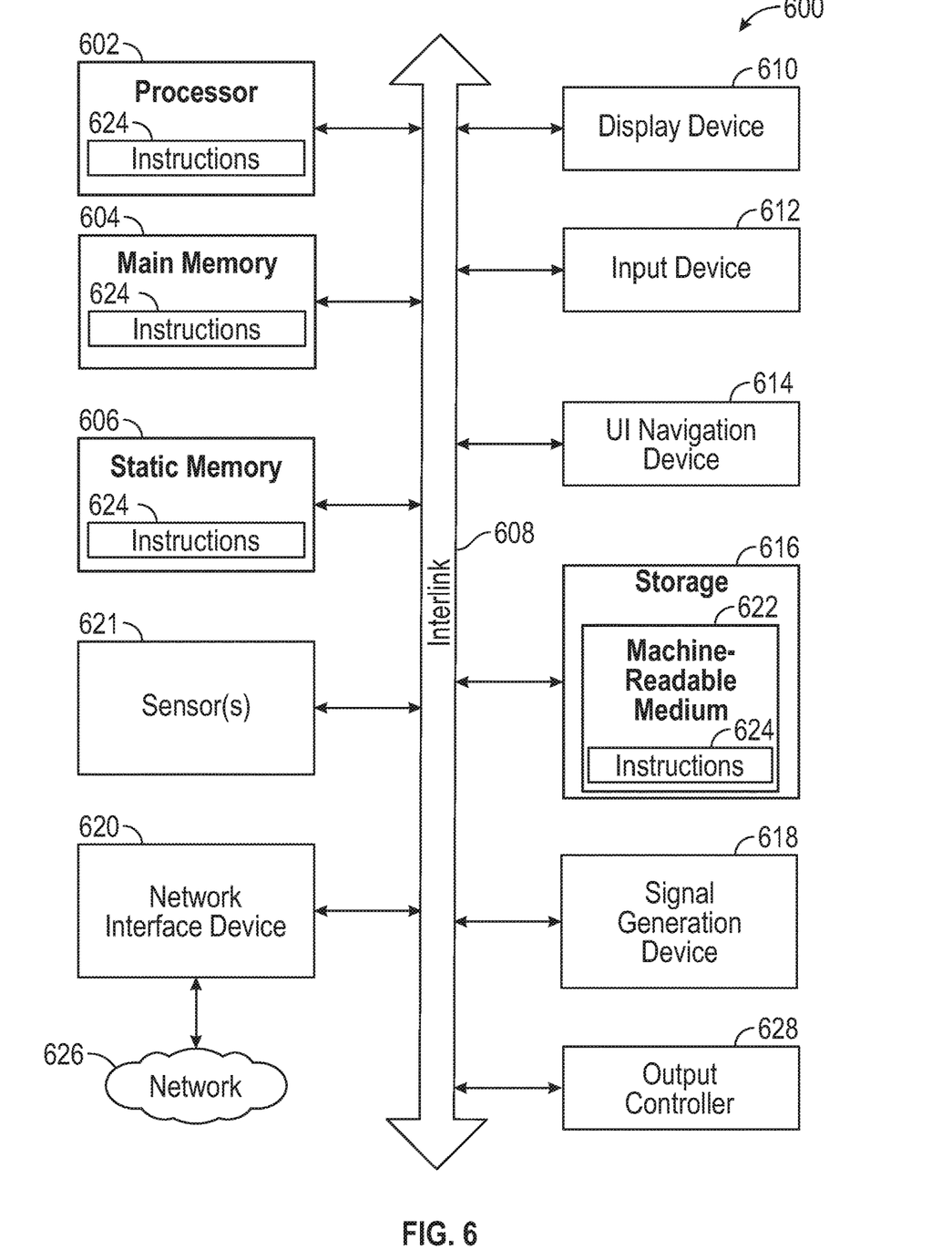
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), a legacy telephone network, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The following, non-limiting examples, detail certain aspects of the present subject matter to solve the challenges and provide the benefits discussed herein, among others.

Example 1 is a method for configuring an application, the application being a network-based application operating in a network environment, the method comprising: receiving data indicating a performance condition of the network environment or the application; classifying the performance condition into one of at least two categories, the at least two categories including a normal category indicating a normal condition and at least one non-normal category indicating at least one non-normal condition, setting a configuration parameter for the application, the configuration parameter corresponding to a selected one of the at least two categories, responsive to detecting at least one performance condition classified into the selected one of the at least two categories; and operating the application in the network environment using the configuration parameter.

In Example 2, the subject matter of Example 1 can optionally include wherein the configuration parameter includes a parameter related to resource assignments on a server.

In Example 3, the subject matter of any of Examples 1-2 can optionally include wherein the at least two categories include a conditional category, and wherein the method further comprises requesting user input to move performance conditions within the conditional category into one of the normal category or the at least one non-normal category.

In Example 4, the subject matter of any of Examples 1-3 can optionally include forecasting an application pattern for the application; learning a relationship between calendar dates and the application pattern; predicting subsequent application patterns based on the relationship; and providing the configuration parameter to the application based on the predictions.

In Example 5, the subject matter of Example 4 can optionally include comprising classifying performance conditions based on the learning.

In Example 6, the subject matter of Example 4 can optionally include acquiring network traffic transaction data from the network environment; and predicting traffic loads based on the network traffic transaction data.

In Example 7, the subject matter of any of Examples 4-6 can optionally include wherein forecasting the application pattern comprises detecting user interactions with the application.

In Example 8, the subject matter of any of Examples 4-7 can optionally include wherein learning the relationship comprises detecting a peak traffic level using a machine learning process.

In Example 9, the subject matter of any of Examples 1-8 can optionally include forecasting a result of non-normal performance conditions within the network environment; learning rules for reacting to the non-normal performance conditions; and providing the rules to the application.

In Example 10, the subject matter of any of Examples 1-9 can optionally include setting configuration parameters corresponding to the selected one of the at least two categories, for at least one other application related to the application.

In Example 11, the subject matter of Example 10 can optionally include wherein the application and the at least one other application comprise software as a service (Saas) applications.

In Example 12, the subject matter of any of Examples 1-11 can optionally include wherein the data is provided by an Internet of Things device.

In Example 13, the subject matter of any of Examples 1-12 can optionally include wherein the data is provided by an application user.

Example 14 is at least one machine-readable medium including instructions that, when executed by processing circuitry, cause the processing circuitry to perform operations to implement of any of Examples 1-13.

Example 15 is an system comprising means to implement of any of Examples 1-13.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for configuring an application, the application being a network-based application operating in a network environment, the method comprising:
   receiving, by a processor, data indicating a performance condition of at least one of the network environment or the application;
   providing, by the processor, the data to a plurality of processes associated with the processor, the plurality of processes including at least one machine learning process and at least one non-machine learning process;
   determining, based on the received data by the plurality of processes, which of a plurality of categories to classify the performance condition into, the plurality of categories including:
   at least one non-normal category indicating at least one non-normal condition, the at least one non-normal condition causing performance degradation, wherein the at least one non-normal condition includes at least one of an error condition, an unexpected condition, an unexpected user input, or a high load condition,
   a conditional category to trigger a request for input from a user to move the performance condition into one of the at least non-normal category or a normal category, and
   the normal category indicating a normal condition, the normal condition including any performance condition not classified into a non-normal category of the at least one non-normal category or the conditional category,
   wherein each of the at least one non-normal category and the normal category is associated with at least one specified configuration parameter to be applied to the application;
   adjusting, by the processor, a setting of the application according to the determined category using the at least one specified configuration parameter associated with the determined category, responsive to detecting at least one performance condition classified into the determined one of the plurality of categories; and
   operating, by the processor, the application in the network environment using the adjusted setting according to the configuration parameter.

2. The method of claim 1, wherein the configuration parameter includes a parameter related to resource assignments on a server.

3. The method of claim 1, wherein the method further comprises requesting user input to move performance conditions within the conditional category into one of the normal category or the at least one non-normal category.

4. The method of claim 1, wherein the at least one machine learning process is configured to perform operations comprising:
   forecasting an application pattern for the application;
   learning a relationship between calendar dates and the application pattern; and
   predicting subsequent application patterns based on the relationship.

5. The method of claim 4, further comprising:
   acquiring network traffic transaction data from the network environment; and
   predicting traffic loads based on the network traffic transaction data.

6. The method of claim 5, wherein forecasting the application pattern comprises detecting user interactions with the application.

7. The method of claim 4, wherein learning the relationship comprises detecting a peak traffic level using a machine learning process.

8. The method of claim 1, comprising:
   forecasting a result of non-normal performance conditions within the network environment;
   learning rules for reacting to the non-normal performance conditions; and
   providing the rules to the application.

9. The method of claim 1, comprising setting configuration parameters corresponding to the selected one of the plurality of categories, for at least one other application related to the application.

10. The method of claim 9, wherein the application and the at least one other application comprise software as a service (SaaS) applications.

11. The method of claim 1, wherein the data is provided by an Internet of Things device.

12. The method of claim 1, wherein the data is provided by an application user.

13. At least one non-transitory machine-readable medium including instructions for configuring an application, which when executed by processing circuitry, cause the processing circuitry to perform operations to:
   receive data indicating a performance condition of a network environment or the application;
   provide the data to a plurality of processes associated with the processing circuitry, the plurality of processes including at least one machine learning process and at least one non-machine learning process;
   determining, based on the received data by the plurality of processes, which of a plurality of categories to classify the performance condition into, the plurality of categories including:
   at least one non-normal category indicating at least one non-normal condition, the at least one non-normal condition causing performance degradation, wherein the at least one non-normal condition includes an error condition, an unexpected condition, an unexpected user input, or a high load condition,
   a conditional category to trigger a request for input from a user to move the performance condition into one of the at least non-normal category or a normal category, and
   the normal category indicating a normal condition, the normal condition including any performance condition not classified into a non-normal category of the at least one non-normal category or the conditional category,
   wherein each of the at least one non-normal category and the normal category is associated with at least one specified configuration parameter to be applied to the application;
   adjust a setting of the application according to the determined category using the at least one specified configuration parameter associated with the determined category, responsive to detecting at least one performance condition classified into the determined one of the plurality of categories; and
   operate the application in the network environment using the adjusted setting according to the configuration parameter.

14. The at least one non-transitory machine-readable medium of claim 13, wherein the operations include requesting user input to move performance conditions within the conditional category into one of the normal category or the at least one non-normal category.

15. The at least one non-transitory machine-readable medium of claim 13, wherein the at least one machine learning process is configured to perform operations further comprising:
- forecasting an application pattern for the application;
- learning a relationship between calendar dates and the application pattern; and
- predicting subsequent application patterns based on the relationship.

16. The at least one non-transitory machine-readable medium of claim 13, wherein the operations further comprise:
- forecasting a result of non-normal performance conditions within the network environment;
- learning rules for reacting to the non-normal performance conditions; and
- providing the rules to the application.

17. A system comprising:
- at least one processor; and
- a storage device comprising instructions, which when execute by the at least one processor, configure the at least one processor to perform operations comprising:
  - receiving data indicating a performance condition of a network environment or a network-based application;
  - providing the data to a plurality of processes associated with the at least one processor, the plurality of processes including at least one machine learning process and at least one non-machine learning process;
  - determining, based on the received data by the plurality of processes, which of a plurality of categories to classify the performance condition into, the plurality of categories including:
    - at least one non-normal category indicating at least one non-normal condition, the at least one non-normal condition causing performance degradation, wherein the at least one non-normal condition includes at least one of an error condition, an unexpected condition, an unexpected user input, or a high load condition,
    - a conditional category to trigger a request for input from a user to move the performance condition into one of the at least non-normal category or a normal category, and
    - the normal category indicating a normal condition, the normal condition including any performance condition not classified into a non-normal category of the at least one non-normal category or the conditional category,
  - wherein each of the at least one non-normal category and the normal category is associated with at least one specified configuration parameter to be applied to the application;
  - adjusting a setting of the application according to the determined category using the at least one specified configuration parameter associated with the determined category, responsive to detecting at least one performance condition classified into the determined one of the plurality of categories; and
  - operating the application in the network environment using the adjusted setting according to the configuration parameter.

18. The system of claim 17, wherein the operations further comprise requesting user input to move performance conditions within the conditional category into one of the normal category or the at least one non-normal category.

19. The system of claim 17, wherein the at least one machine learning process is configured to perform operations further comprising:
- forecasting an application pattern for the application;
- learning a relationship between calendar dates and the application pattern; and
- predicting subsequent application patterns based on the relationship.

20. The system of claim 17, wherein the operations further comprise:
- forecasting a result of non-normal performance conditions within the network environment;
- learning rules for reacting to the non-normal performance conditions; and
- providing the rules to the application.

* * * * *